April 22, 1952    F. H. EDGERLY    2,593,424
HOLLOW FLOOR HEATING SYSTEM
Filed April 9, 1949    2 SHEETS—SHEET 1

INVENTOR.
Fay H. Edgerly
BY
Stanley Lightfoot

April 22, 1952   F. H. EDGERLY   2,593,424
HOLLOW FLOOR HEATING SYSTEM
Filed April 9, 1949   2 SHEETS—SHEET 2
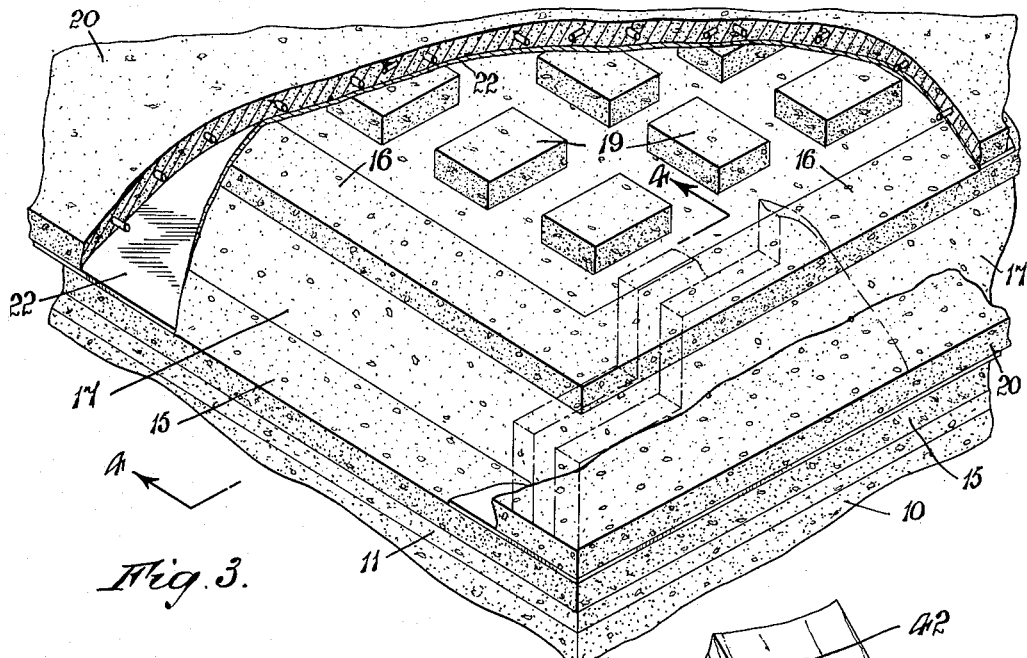
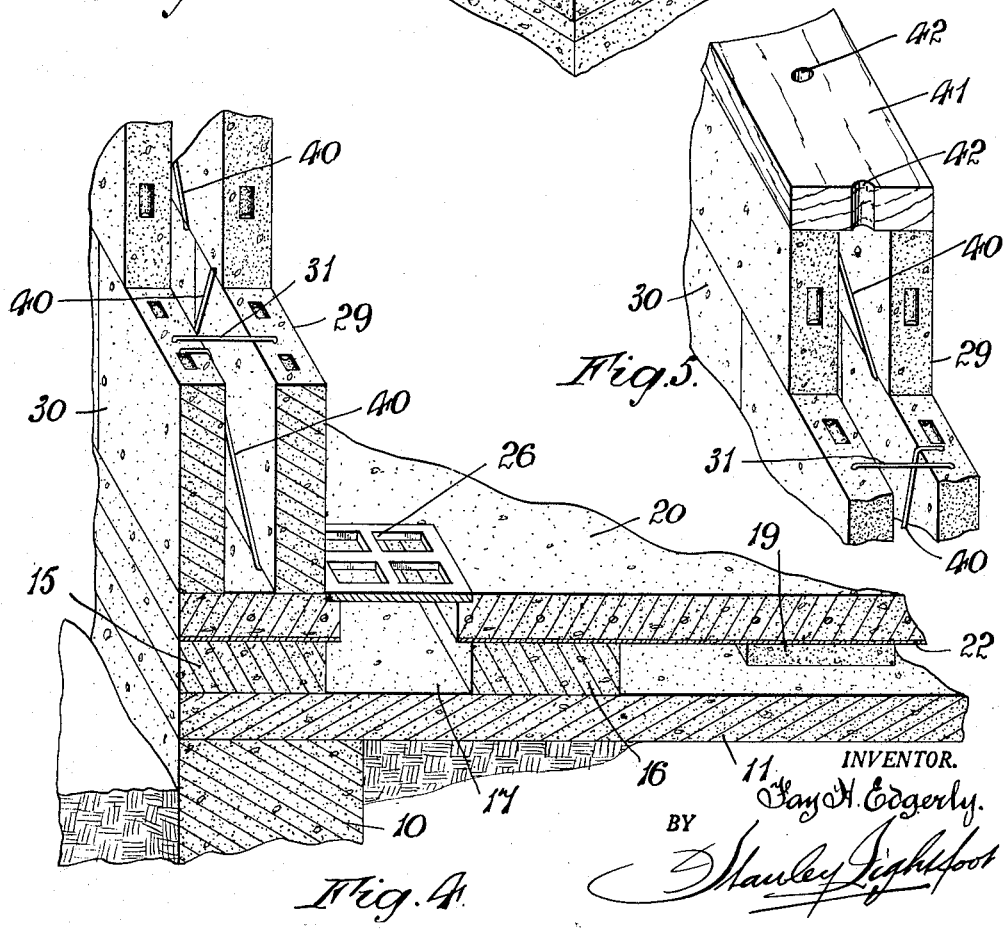
INVENTOR.
Fay H. Edgerly.
BY
Stanley Lightfoot

Patented Apr. 22, 1952

2,593,424

UNITED STATES PATENT OFFICE 2,593,424

HOLLOW FLOOR HEATING SYSTEM

Fay H. Edgerly, Detroit, Mich.

Application April 9, 1949, Serial No. 86,561

3 Claims. (Cl. 98—31)

This invention relates to building construction and more particularly to the construction of single story or bungalow type houses, and has for its object to provide a structure involving a heating system wherein the entire or practically the entire system is incorporated in the floor structure of the building.

The invention also contemplates such a building wherein both direct hot air and radiant heating principles are provided for in the floor structure of the building.

The invention also aims to provide a building construction wherein a double floor structure is provided with means for distributing air between the upper and lower layers of said floor structure from a heater located in a pit beneath the floor structure, cool air returns to the said pit from the rooms above the floor being provided beneath the lower layer of the said floor structure.

A still further object of the said invention is to provide in the aforesaid floor structure a heat dividing wall or partition spaced inwardly and parallel to the outer wall of the building to provide a cool air channel around the heated space beneath the major portion of the upper layer of floor, said channel opening into the aforesaid cool air return ducts, and the upper layer of the floor having cool air return registers opening into said channel.

It is further an object of the said invention to provide a simple and readily accomplished means of laying such a floor structure employing ordinary cement pouring techniques and involving the simplest of constructional forms with consequent low expense; and it is also proposed to provide a simple side wall structure of the said building involving the use of more or less plain rectangular slabs arranged in spaced relation to provide a completely hollow wall, the slabs being pressed transversely of the wall to maintain their even spacing and in an angular manner to provide strength in the wall structure.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel constructional arrangement hereinafter described, by way of example, having reference to the accompanying drawings, wherein:

Figure 3 is a broken perspective view illustrating a corner portion of the floor and wall construction;

Figure 4 is a detail vertical section through the same taken on a plane indicated by the line 4—4 in Figure 3; and Figure 5 is a fragmentary perspective detail of the upper portion of the wall construction.

Similar characters of reference indicate similar parts in the several figures of the drawings.

Figures 1, 2:
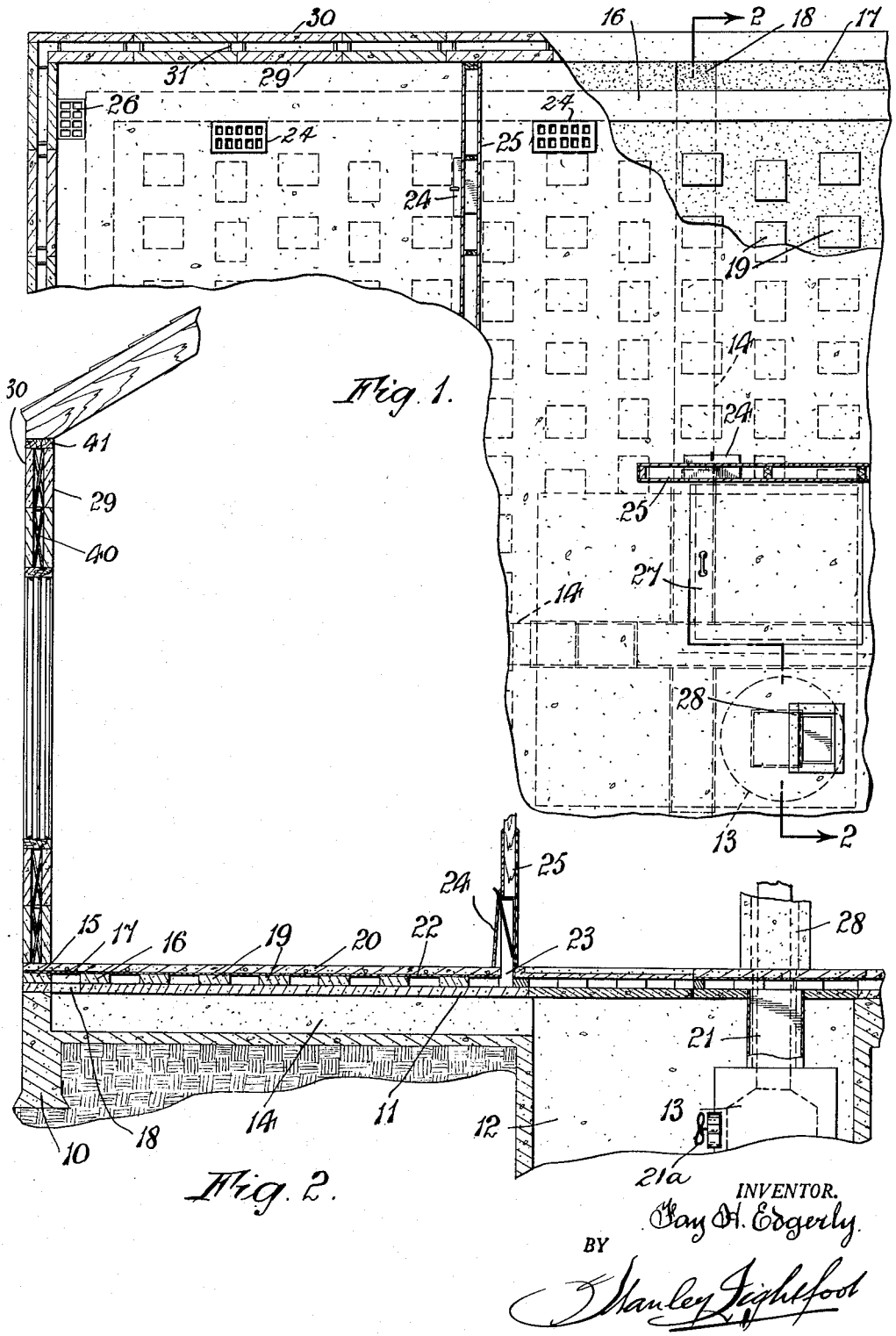
Figure 1 is a partial floor plan of a building structure embodying the said invention.
Figure 2 is a vertical sectional elevation taken on planes indicated by the line 2—2 in Figure 1.

The foundation 10 marginally supports a sub-floor 11 which I prefer to lay directly over the ground, sinking a pit 12 in the ground at a point preferably remote from the side walls of the building to accommodate an air heater or furnace 13 which, for convenience in fueling, is preferably gas or oil fired.

The sub-floor 11 is provided therebeneath with air ducts 14 radiating from the upper portion of the pit 12 and terminating proximate to the outer walls of the structure.

15 indicates an outer wall base poured or laid above the foundation 10 and defining the outline in plan of the outer wall of the building; and spaced in parallel relation to this wall base 15 a heating divider wall 16 is poured or laid on the sub-floor 11, of the same height as the wall base 15, to provide a continuous channel 17 running around the margin of the said sub-floor 11 contiguous to the side walls of the building. The outer ends of the ducts 14 are vented through the sub-floor 11, at 18, into said channel 17.

At suitable points over the surface of the sub-floor I lay a large number of spacers, such as concrete blocks 19, of a thickness agreeing with the height of the divider wall 16 above the sub-floor 11, and these spacer blocks may or may not be cemented or otherwise secured to the sub-floor, according to the wishes of the builder.

The blocks 19 are, however, so spaced as to allow ready air circulation therearound, although they should be so spaced as to cause air traveling from the furnace or heater to the heat divider wall 16 to follow a devious path and thereby thoroughly, and more or less evenly, flow beneath the floor proper 20 which is laid over the said pit 12, blocks 19 and heat divider wall 16 to or beneath the outer wall structure of the building.

21 indicates a hot air pipe opening from the heater 13 to the space between the sub-floor 11 and the floor proper 20. 22 indicates sheet metal which I propose to first lay over the said blocks 19 and other supporting structure before pouring the floor 20, said sheet metal supporting the said floor 20, and also operating as a means of promoting the even transfer of heat to the said floor 20 from hot air traveling through the spacing therebeneath.

At suitably strategic points, hot air exhaust openings 23 are provided in the floor 20 to permit the escape of heated air from the space beneath said floor 20 to promote the flow of air through the said space and to prevent the formation of undesirable air traps therein, and these openings 23 may very conveniently open into registers 24 provided in the floor 20 inwardly of the divider wall 16 or in partition walls 25 as shown.

It will be observed that the arrangement described combines both radiant heat for the building through the floor 20 thereof, and direct circulatory hot air heating for the rooms through the registers 24 when they are open for that purpose. Consequently the rooms, or any room, of the building may be quickly heated upon the initial operation of the heater 13 by permitting the resulting hot air to enter the rooms directly through the open registers 24 until such time as the floor 20 has become heated throughout its area to an extent providing the desired radiant heat.

Still further, the provision of these hot air registers permits the distribution of humidified air to the rooms of the building to overcome the lack of humidity which is an objectionable feature of purely radiant heating as ordinarily installed.

It will also be noted that a floor structure such as that described permits, by the use of suitable air impelling means such as a fan 21a in conjunction with the duct 21, for instance, the air-cooling of the said floor and also of the rooms by way of the registers 24 during the summer months.

At points remote from the registers 24 are cool air registers 26 leading to the cool air channel 17 and thence to the cool air ducts 14. It will be observed that the channel 17, extending entirely around the floor of the building adjacent to the outer wall and separated by the divider wall 16 from the heat space between the floors through which the heated air flows, insulates the heated air between the floor layers from coming into direct cooling contact with the outer wall of the building, and thus the efficiency of the heating system is thereby increased.

27 indicates a trap door inside the building through which access to the pit 12 may be attained, and 28 indicates a chimney extending upwardly from the furnace, where this is desirable.

In order to still further increase the efficiency of the heating system described, I propose to construct the outer wall of the building of entirely separate inner and outer wall elements 29 and 30; simply connecting the slabs of which these walls are constructed by struts or similar members 31. In order to insure strength in this type of structure I also provide braces 40 extending at an angle from the bottom of the slab of one wall element to the top of the opposed slab of the other wall element, as will be seen in Figures 2, 4 and 5. In such a construction a continuous spacing of the inner and outer wall elements throughout the entire area of the wall as a whole may be attained for maximum heat insulation.

Figure 5 shows the upper portion of such a wall structure capped by a wood plate 41 which is drilled at 42 to provide vents on the spacing between the wall elements 29 and 30. This plate may serve to support the lower ends of the roof rafters of the building, as will be well understood by those familiar with this art.

The described and illustrated constructional arrangement may be very cheaply and readily attained by first pouring, in concrete, the radial troughs for the cool air ducts 14 leading from the pit 12, which pit may be thereafter lined with concrete, and the sub-floor 11 is poured to close the top of the said cool air ducts with the exception of the outer terminals thereof, following which the heat divider wall 16 and the wall base 15 are poured or laid in spaced relation to one another to provide the cool air channel 17. After placing or securing the blocks 19 within the space bound by the heat divider wall 16, the whole of the said structure is then covered with sheet material or metal 22 over which the reinforced floor proper 20 is poured. The outer wall structure of the building is then erected preferably directly on the marginal portions of the said floor proper 20.

It will be seen that the plurality of spaced blocks 19 serve both as an efficient support for the main area of the floor proper and as baffle means for the air circulating beneath the floor to insure effective heat distribution thereto. Also the divider wall 16 acts as a continuous support for the floor proper in parallel spaced relation to the outer walls of the building.

It will be still further apparent that the heating of the sub-floor 11 by heated air passing between the upper and lower layers of the floor serves to some extent as a preheating means for the cool return air passing through the ducts 14 to the furnace pit 12, which also promotes efficiency in the heating system. At the same time the presence of the cool return air channel 17 about the margin of the floor reduces heat loss from the heat space between the floors to, or through, the outer wall of the building, as any heat which passes through the divider wall 16 is absorbed by air within the channel 17 circulating back to the furnace pit.

The proposed side wall construction for the building wherein the slabs of the inner and outer elements of the wall are entirely spaced from each other throughout their entire area, being merely connected by the transverse struts 31 and diagonal braces 40, minimizes heat loss by conduction through the said wall, and at the same time provides a wall which may be quickly and cheaply constructed.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a building structure, an outer wall, a floor extending to said wall, a sub-floor spaced below said floor, a divider wall between said floor and said sub-floor, said divider wall being spaced from and substantially parallel to said outer wall thereby defining a central heat space throughout the major area of the floor and a surrounding narrow marginal cool air channel, air outlet means in the floor opening into said cool air channel, hot air inlet means in said floor opening into said central heat space inwardly of the divider wall, a pit structure beneath said floor and remote from said outer wall, means for causing an air flow from said pit structure through the heat space between said floors, and cool air return ducts extending from said cool air channel to said pit.

2. In a building structure, an outer wall, a floor extending to said wall, a sub-floor spaced below said floor, a divider wall between said floor and said sub-floor, said divider wall being spaced from and substantially parallel to said outer wall thereby defining a central heat space throughout the major area of said floor and a surrounding narrow marginal cool air channel, a pit structure beneath said floor and remote from said outer wall, means for causing an air flow from said pit structure through the heat space between said floors, cool air return registers opening through said floor to said cool air channel and cool air return ducts between said cool air channel and said pit structure and hot air inlet registers opening through said floor into the heat space inwardly of said divider wall.

3. In a building structure, an outer wall, a floor extending to said wall, a sub-floor spaced below said floor, a divider wall between said floor and sub-floor, said divider wall being spaced from and substantially parallel to said outer wall thereby defining a central heat space throughout the major area of said floor and a surrounding narrow marginal cool air channel, a pit structure beneath said floor and remote from said outer wall, means for causing an air flow from said pit structure through the heat space between said floors, hot air supply registers opening through said floor to said central heat space inwardly of said divider wall, cool air return registers opening through said floor outwardly of said divider wall to said cool air channel and cool air return ducts forming communication between said pit structure and cool air channel at points remote from said cool air return registers.

FAY H. EDGERLY.

REFERENCES CITED

The following references are of record in the file of this patent:

UNITED STATES PATENTS

| Number | Name | Date |
|---|---|---|
| 90,580 | Reily | May 25, 1869 |
| 1,002,407 | Kleinschmidt | Sept. 5, 1911 |
| 1,280,173 | Cutler | Oct. 1, 1918 |
| 1,304,651 | Bodine | May 27, 1919 |
| 1,645,611 | Mederer | Oct. 18, 1927 |
| 2,192,567 | Waugh | Mar. 5, 1940 |
| 2,445,920 | Olson | July 27, 1948 |
| 2,512,854 | Edgerly | June 27, 1950 |

FOREIGN PATENTS

| Number | Country | Date |
|---|---|---|
| 705,062 | Germany | Apr. 16, 1941 |

OTHER REFERENCES

Article from Brick & Clay Record Magazine, February 1947, page 19.

Radiant Heating With Warm Air, by J. L. Shank, American Builder, January 1948.